(12) United States Patent
Watanabe

(10) Patent No.: US 7,940,454 B2
(45) Date of Patent: May 10, 2011

(54) OPTICAL PARAMETRIC AMPLIFIER

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 11/785,494

(22) Filed: Apr. 18, 2007

(65) Prior Publication Data

US 2008/0165412 A1 Jul. 10, 2008

(30) Foreign Application Priority Data

Sep. 29, 2006 (JP) ................... 2006-268541

(51) Int. Cl.
- *H04B 10/17* (2006.01)
- *G02F 1/39* (2006.01)
- *G02F 1/365* (2006.01)
- *H04B 10/12* (2006.01)

(52) U.S. Cl. ........... 359/341.3; 359/330; 359/334; 359/339

(58) Field of Classification Search ............. 359/330, 359/334, 341.3, 349
See application file for complete search history.

(56) References Cited

U.S. PATENT DOCUMENTS

| | | | |
|---|---|---|---|
| 5,274,495 A * | 12/1993 | Shirasaki ............... | 359/330 |
| 5,596,667 A | 1/1997 | Watanabe | |
| 5,798,853 A | 8/1998 | Watanabe | |
| 6,043,927 A * | 3/2000 | Islam ................... | 359/332 |
| 6,101,023 A * | 8/2000 | Meyer et al. ........... | 359/330 |
| 6,198,569 B1 * | 3/2001 | Lawrence et al. ........ | 359/333 |
| 6,961,170 B2 * | 11/2005 | Hubbard ............... | 359/330 |
| 7,038,838 B2 * | 5/2006 | Bayart et al. .......... | 359/333 |
| 7,102,813 B2 | 9/2006 | Gomes et al. | |
| 2002/0015219 A1 * | 2/2002 | Islam ................... | 359/334 |
| 2002/0171913 A1 | 11/2002 | Batchko et al. | |
| 2004/0042060 A1 * | 3/2004 | McKinstrie et al. ...... | 359/330 |
| 2004/0125434 A1 * | 7/2004 | Kumar et al. .......... | 359/330 |
| 2004/0196533 A1 * | 10/2004 | Bayart et al. .......... | 359/337 |
| 2004/0213302 A1 * | 10/2004 | Fermann et al. ....... | 372/6 |
| 2005/0094249 A1 * | 5/2005 | Imajuku et al. ........ | 359/330 |
| 2005/0111802 A1 * | 5/2005 | Lee et al. ............. | 385/123 |
| 2005/0146780 A1 * | 7/2005 | McKinstrie et al. ..... | 359/330 |
| 2005/0157760 A1 * | 7/2005 | Rice et al. ............ | 372/6 |
| 2005/0206997 A1 * | 9/2005 | Hubbard .............. | 359/330 |

(Continued)

FOREIGN PATENT DOCUMENTS

EP 1 681 542 A1 7/2006

(Continued)

OTHER PUBLICATIONS

Watanabe et al., "Novel Fiber Kerr-Switch with Parametric Gain: Demonstration of Optical Demultiplexing and Sampling up to 640 Gb/s", ECOC. 2004, Th4.1.6.

(Continued)

*Primary Examiner* — Eric Bolda
(74) *Attorney, Agent, or Firm* — Staas & Halsey LLP

(57) ABSTRACT

In an optical parametric amplifier of the invention, pumping light which is amplified using a practical optical amplifier such as an EDFA is supplied together with signal light having a wavelength outside the amplification band of the optical amplifier, to a nonlinear optical medium via a multiplexer, to thereby amplify the signal light by an optical parametric amplification effect due to the pumping light in the nonlinear optical medium. As a result, the amplification band of a practical optical amplifier such as an EDFA, can be extended, and the noise characteristics can be improved.

18 Claims, 7 Drawing Sheets

U.S. PATENT DOCUMENTS

| | | | |
|---|---|---|---|
| 2005/0238070 A1* | 10/2005 | Imeshev et al. | 372/21 |
| 2005/0271094 A1* | 12/2005 | Miller et al. | 372/25 |
| 2006/0051100 A1* | 3/2006 | Watanabe | 398/152 |

FOREIGN PATENT DOCUMENTS

| | | |
|---|---|---|
| JP | 07/098464 | 4/1995 |
| JP | 02001305594 A * | 10/2001 |
| JP | 2001318397 A * | 11/2001 |
| JP | A-2004-193886 | 7/2004 |
| JP | 2006-509225 | 3/2006 |
| JP | 2006-184851 | 7/2006 |
| WO | WO 94/09403 | 4/1994 |
| WO | WO 97/08585 | 3/1997 |
| WO | WO 2004/051892 | 6/2004 |

OTHER PUBLICATIONS

Jonas Hansryd, Peter A. Andrekson, Mathias Westlund, Jie Li & Per-Olof Hedekvist; *Fiber-Based Optical Parametric Amplifiers and Their Applications*, May/Jun. 2002 IEEE Journal of Selected Topics, Vol. 8, No. 3.

Yang Cao, M. Yasin Akhtar Raja, *Gain-Flattened Ultra-Wideband Fiber Amplifiers*, X002447034, Jun. 13, 2003, pp. 3447-3451.

C. Floridia, M.L. Sundheimer, S.R. Luthi & A.S.L. Gomes, *Simultaneous $S^+$-Band Amplification and $S^+$-C-Band Wavelength Conversion in CW Pumped Fibre Optic Parametric Amplifier*, Mar. 4, 2004, vol. 40, No. 5, 2-pages.

Extended European search report, Sep. 7, 2007, Application No. 07106943.9-2205, Reference No. 121291 a/jme.

G. F. Guimarães, et al., "TDFA/FOPA Hybrid for Broadband Amplification and Frequency Conversion in Optical Communications", Electronics Letters, vol. 42, No. 17, 997-998, Aug. 17, 2006.

G. F. Guimarães, et al., "High Performance Hybrid EDFA-FOPA Pre-Amplifier for 40 Gb/s Transmission", CLEO 2005, vol. 2, 989-991, May 2005.

Japanese Patent Office Action mailed Aug. 10, 2010 for corresponding Japanese Patent Application No. 2006-268541.

* cited by examiner

OPTICAL PARAMETRIC AMPLIFIER

BACKGROUND OF THE INVENTION

1. Field of the Invention

The present invention relates to technology for amplifying light using a nonlinear optical effect, and in particular relates to an optical parametric amplifier which amplifies signal light using an optical parametric effect which is produced by four wave mixing or the like.

2. Background Art

In previous and present optical communication systems, a single wavelength transmission system of 10 Gb/s, or a wavelength-division multiplexed (WDM) transmission system have been developed which compensate for a decay in the signal light power due to losses of the transmission path fiber, by means of an optical amplifier such as an optical fiber amplifier.

One large problem at present is that there is a limit to the amplification band of the actual optical fiber amplifier. More specifically, in an erbium ($Er^{3+}$) doped fiber amplifier (EDFA), the amplifying range in the C-band in the vicinity of 1535 nm to 1565 nm, and in the L-band in the vicinity of 1570 nm to 1610 nm is limited. In order to amplifying bands other than the C- and L-bands, there has been proposed an optical fiber amplifier or the like which is doped with a material other than $Er^{3+}$, however the present situation is that this has not yet been obtained the feasibility of an EDFA.

Furthermore, in the EDFA, the noise figure is limited to 5 to 6 dB or thereabove, so that there is also the problem that the influence of the reduction in optical S/N ratio due to the added amplified spontaneous emission (ASE) is severe. This becomes a large limiting factor in the long distance transmission of signal light which is to be sped up in the future to 40 Gb/s or 160 Gb/s by limiting the repeater interval in the optical transmission system which uses an optical amplifier. The actual transmission distance in present systems is limited to several 100 kilometers for signal light of 40 Gb/s, and to several kilometers at most for signal light of 160 Gb/s.

To address the above problem of optical fiber amplifiers such as EDFAs, as an optical amplifying technique aimed at covering a wider band, for example an optical Raman amplifier has been proposed which uses a stimulated Raman scattering, being one of the nonlinear optical effects. Furthermore, there is also known a technique for amplifying signal light using an optical parametric amplification effect which is produced by four wave mixing (FWM) or the like, and various types of optical devices which adopt this optical parametric amplification have been proposed (for example refer to PCT International Publication No. WO 94/09403 pamphlet, Japanese Unexamined Patent Publication Nos. 7-98464, and 2006-184851, and Watanabe et al., "Novel Fiber Kerr-Switch with Parametric Gain: Demonstration of Optical Demultiplexing and Sampling up to 640 Gb/s", ECOC. 2004, Th 4.1.6.).

However, the above conventional optical Raman amplifier is a gain-distributed type optical amplifier which uses a part or all of the transmission path fiber as an amplification medium, so that there is the problem that the maintenance and administration of the transmission path is extremely difficult.

On the other hand, in an optical amplifier which uses the optical parametric amplification effect, the construction is basically different to that of the gain-distributed type optical amplifier. Therefore the abovementioned problems with the maintenance and administration do not arise. Furthermore, there is less deterioration in the optical S/N ratio due to ASE noise compared with the EDFA. Therefore it is possible to realize favorable noise characteristics. However, the apparatus proposed up until now which uses the optical parametric amplification effect is limited to a configuration in which it is presumed that the wavelength of signal light corresponding to the amplification band of the actual optical amplifier such as the EDFA or the like, that is to say the signal light of the C-band or the L-band or the like is amplified, and there has yet to be a proposal for a specific and practical configuration for amplifying the signal light outside of the amplification band of the conventional optical amplifier.

SUMMARY OF THE INVENTION

An object of the present invention is to provide an optical parametric amplifier which can extend the amplification band of a practical optical amplifier such as an EDFA, and improve the noise characteristics.

In order to achieve the above object, the optical parametric amplifier of the present invention is an optical parametric amplifier provided with a nonlinear optical medium to which is input signal light and pumping light for which the wavelength is different to that of the signal light, which amplifies the signal light by an optical parametric amplification effect due to the pumping light, and outputs this. The optical parametric amplifier comprises: a first optical amplifying section which has an amplification band which includes the wavelength of the pumping light, and which amplifies the pumping light and outputs this; and a pumping light supply section which supplies pumping light output from the first optical amplifying section, together with signal light having a wavelength outside the amplification band of the first optical amplifying section, to the nonlinear optical medium.

In the above configuration, the conventional practical optical amplifier is used as the first optical amplifying section, and the pumping light which is amplified by the first optical amplifying section is supplied to the nonlinear optical medium by the pumping light supply section. As a result, in the nonlinear optical medium, signal light having a wavelength outside of the amplification band of the first optical amplifying section is optical parametric amplified by four wave mixing or the like which is produced by the pumping light.

According to the abovementioned optical parametric amplifier of the present invention, due to the optical parametric amplification effect by means of the pumping light which is amplified by the first optical amplifying section using the conventional practical optical amplifier, signal light having a wavelength outside of the amplification range of the first optical amplifying section can be amplified. Therefore it is possible to extend the amplification band of the conventional optical amplifier for which the amplification band is limited. Moreover with optical parametric amplifying, the deterioration in optical S/N ratio due to the ASE noise is small. Therefore, the signal light can be amplified with favorable noise characteristics.

Other objects, feature, and advantages of the present invention will become apparent from the following description of the embodiments, in conjunction with the appended drawings.

DETAILED DESCRIPTION OF THE INVENTION

Hereunder is a description of a best mode for carrying out the present invention with reference to the appended drawings. Throughout the drawings the same reference symbols denote the same or equivalent components.

Figure 1:
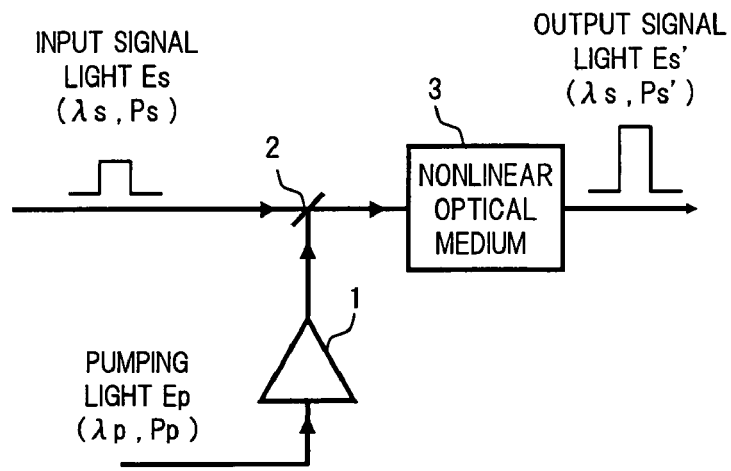
FIG. 1 is a diagram showing a basic configuration of an optical parametric amplifier according to the present invention.

FIG. 1 is a diagram showing a basic configuration of an optical parametric amplifier according to the present invention.

In FIG. 1, the optical parametric amplifier comprises; an optical amplifier 1 serving as a first optical amplifying section, a multiplexer 2 serving as a pumping light supply section, and a nonlinear optical medium 3. The optical amplifier 1 has an amplification band (for example a C-band or L-band etc.) the same as the aforementioned conventional optical amplifier such as an EDFA, and amplifies pumping light Ep having a wavelength within the amplification band, up to a desired level, and outputs this to the optical multiplexer 2. Here the wavelength of the pumping light Ep is $\lambda p$, and the optical power is Pp.

The multiplexer 2 multiplexes the signal light Es input to the present optical parametric amplifier from a transmission path fiber or the like (not shown in the drawing), and the pumping light Ep output from the optical amplifier 1, and outputs this to the nonlinear optical medium 3. The signal light Es has a wavelength $\lambda s$ which is different to the wavelength $\lambda p$ of the pumping light Ep. The wavelength $\lambda s$ of the signal light Es is basically set to outside of the amplification band of the optical amplifier 1. Here the input power of the signal light Es is Ps, and the output power is Ps'.

The present invention can also be employed for setting the wavelength $\lambda s$ of the signal light Es to a wavelength which is different to the pumping light wavelength $\lambda p$ within the amplification band of the optical amplifier 1, and a specific example of this will be described later.

To the nonlinear optical medium 3 is input the signal light Es and the pumping light Ep output from the multiplexer 2, and by means of the optical parametric amplification effect produced by four wave mixing or the like due to the pumping light Ep, the signal light Es is amplified and output. As the nonlinear optical medium 3, for example, in the case where the optical fiber is used, a single mode optical fiber may be used. Furthermore, it also effective to use a highly nonlinear fiber (HNLF) for which the nonlinear optical effect is increased. As a specific highly nonlinear fiber, it is possible to use a type in which the optical power density has been increased by a scheme to increase the nonlinear refractive index by doping the core with germanium or bismuth or the like, and reducing the mode-field, or to use a type which uses a photonic crystal fiber structure. Moreover, as an other device which has the optical parametric amplification effect, it is possible to use an optical waveguide of periodically poled lithium niobate (PPLN) or the like having a quasi phase-matching structure which can effectively generate a secondary nonlinear optical effect of three wave mixing (TWM) or the like (for example refer to I. Brener et al., "Polarisation-insensitive wavelength converter based on cascaded nonlinearities in $LiNbO_3$ waveguides", Electronics Letters, 6 Jan. 2000, Vol. 36, No. 1, p. 66-67), or an optical crystal of KTP or the like, or a semiconductor element of gallium-aluminum arsenic (GaAlAs) or the like, as the nonlinear optical medium 3. Furthermore, in the case where the nonlinear optical medium 3 is an optical fiber, it is preferable to use one which has a zero dispersion wavelength matching or approximately matching the wavelength $\lambda p$ of the input pumping light Ep.

Next is a description of the operation of the optical parametric amplifier having the above basic structure.

Figure 2:
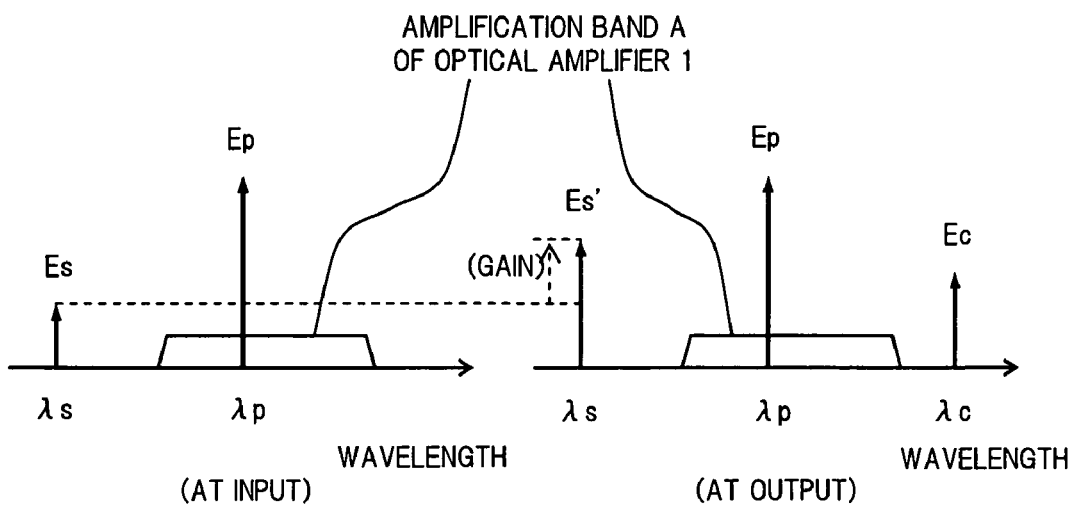
FIG. 2 is a diagram showing a wavelength arrangement of signal light and pumping light in the basic configuration of FIG. 1.

The present optical parametric amplifier is characterized by the point that, as shown in the example of the wavelength arrangement of FIG. 2, the wavelength $\lambda p$ of the pumping light Ep is arranged within the amplification band A of the conventional optical amplifier 1 such as an EDFA, and the signal light Es having the wavelength $\lambda s$ outside of the amplification band of the optical amplifier 1 is optical parametric amplified. More specifically, the pumping light Ep having the wavelength $\lambda p$ within the amplification band A, is amplified up to a desired power Pp by the optical amplifier 1, and is then input to the nonlinear optical medium 3 via the multiplexer 2. In the nonlinear optical medium 3, the signal light Es which has been input via the multiplexer 2, is optical parametric amplified in approximately the same polarization direction as the pumping light Ep, by four wave mixing (FWM) or three wave mixing (TWM) due to the pumping light Ep (refer to signal light Es' for the output shown on the right side of FIG. 2). A light Ec shown on the right side of FIG. 2 is for FWM light (idler light), the frequencies of Ep, Es, and Ec are made respectively $\omega p$, $\omega s$, and $\omega c$, and the frequency $\omega c$ of Ec becomes $(2\omega p - \omega s)$.

Regarding the gain of the abovementioned optical parametric amplifier, for example in the case of FWM, when the power Pp of the pumping light Ep is sufficiently large compared to the power Ps of the signal light Es, this is amplified approximately proportional to the square of the power Pp of the pumping light Ep. More specifically, for example in the case where an optical fiber of length L and loss $\alpha$ is used as the nonlinear optical medium 3, and assuming that the polarization state for all waves are the same and the best phase matching is achieved within the optical fiber, and also the power Pp of the pumping light Ep is sufficiently large compared to the power Ps of the signal light Es and the power Pc of the idler light Ec, then the signal light Es' output from the nonlinear optical medium 3 which uses the abovementioned optical fiber, acquires a gain ηs which satisfies the relation of the following equation.

$$\eta s = \exp(-\alpha \cdot L) \cdot [1 + \phi^2(L)] \quad (1)$$

In equation (1), $\phi(L)$ represents a nonlinear optical phase shift, which satisfies the relationship of the following equation (2).

$$\phi(L) = \gamma \cdot Pp(0) \cdot L_{eff} \quad (2)$$

In equation (2), γ is the third-order nonlinear coefficient for the optical fiber, and is expressed by the following equation (3), using velocity of light c, optical angular frequency ω, nonlinear refractive index $n_2$, and effective core cross-section area $A_{eff}$. Furthermore, Pp (0) is the power of the pumping light Ep input to the optical fiber. Moreover, $L_{eff}$ is the effective nonlinear interaction length, and is expressed by the following equation (4).

$$\gamma = (\omega \cdot n_2)/(c \cdot A_{eff}) \quad (3)$$

$$L_{eff} = [1 - \exp(-\alpha \cdot L)]/\alpha \quad (4)$$

From the relationships of equations (1) to (4), it can be seen that the gain ηs of the optical parametric amplification in the optical fiber, becomes larger in a form which is proportional to the square of the product of the nonlinear constant γ, the pumping light power Pp, and the interactive length $L_{eff}$. However, the generation efficiency of the FWM depends strongly on the polarization of the interacting light waves, and the generation efficiency is the highest between light waves of the same polarization, and between light waves of a mutually orthogonal polarization, FWM is not generated. Consequently, in the case where the power Pp of the pumping light Ep is sufficiently large, the signal light component of the same polarization direction as the pumping light Ep is selectively optical parametric amplified.

The pumping light Ep is continuous wave (CW) light. In the case where this pumping light Ep is input to the nonlinear optical medium 3 at a high power, stimulated Brillouin scattering (SBS) is produced in the nonlinear optical medium 3, so that there is the possibility that the gain of the optical parametric amplification is limited by the SBS. In such a case, for example a method which suitably adds optical phase modulation or optical frequency modulation to the pumping light Ep is effective.

Figure 3:
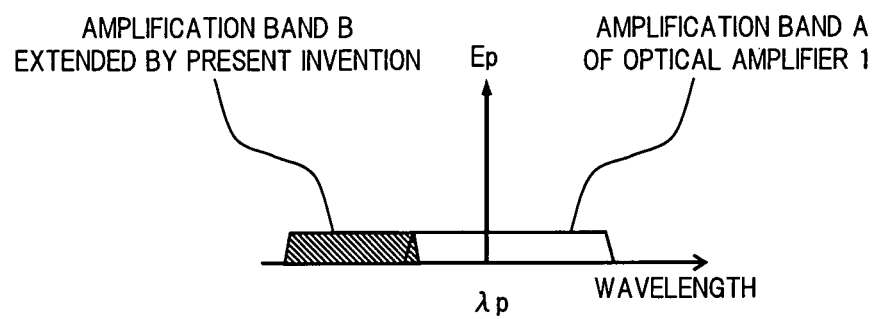
FIG. 3 is a diagram showing an optical parametric amplifying band in the basic configuration of FIG. 1.

FIG. 3 shows an example of an amplification band of an optical parametric amplifier which acquires a gain ηs as mentioned above. In this manner, the amplification band B of the present optical parametric amplifier is formed in a wavelength band shown by oblique lines positioned on the outside (here on the short wavelength side) of the amplification band A of the optical amplifier 1, that is to say, a wavelength range in which the desired gain cannot be acquired with the conventional practical optical amplifier. The width of this amplification band B, in the case where an optical fiber is used as the nonlinear optical medium 3, becomes the widest when the zero dispersion wavelength thereof coincides or approximately coincides with the wavelength λp of the pumping light Ep. In this case, the efficiency of the optical parametric amplification also becomes excellent.

In the above manner, according to the present optical parametric amplifier, by applying the pumping light Ep amplified using the conventional optical amplifier 1 such as an EDFA to the nonlinear optical medium 3, then due to the optical parametric amplification effect due to the FWM or the like, the signal light Es having a wavelength outside of the amplification band of the optical amplifier 1 can be amplified. Consequently, it is possible to extend the amplification band of the optical amplifier such as an EDFA, for which the amplification band is limited. Furthermore, in the optical parametric amplification, since the degradation of optical S/N ratio due to ASE noise is less compared with the EDFA, a favorable noise characteristic can be also realized. Moreover, in the generation of FWM, the phase of the signal light is not disturbed. Therefore, with the present optical parametric amplifier, this can be applied not only to optical intensity modulated signal, but also to optical phase modulated signal and optical frequency modulated signal.

Next is a description of specific embodiments of the optical parametric amplifier which has the basic structure as described above.

Figure 4:
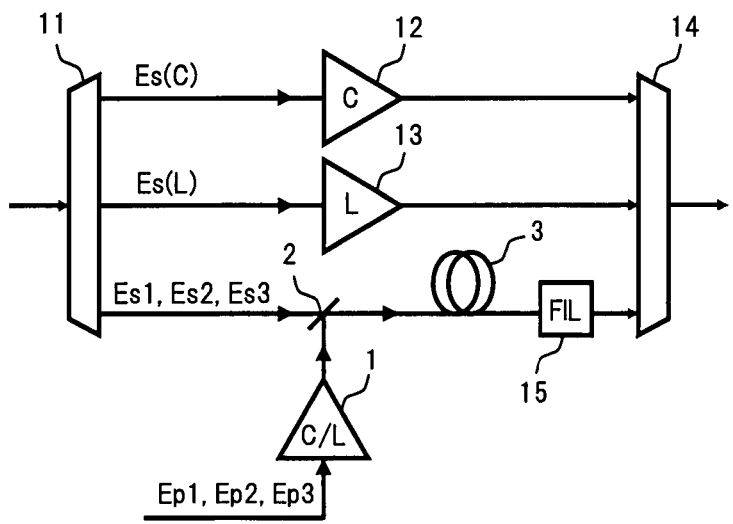
FIG. 4 is a diagram showing a configuration of a first embodiment of an optical parametric amplifier according to the present invention.

FIG. 4 is a diagram showing a configuration of a first embodiment of an optical parametric amplifier according to the present invention.

In FIG. 4, the optical parametric amplifier of this embodiment uses the basic configuration as shown before in FIG. 1, and is configured so as to extend the amplification band of the conventional EDFA corresponding to the C- and L-bands. More specifically, in the present optical parametric amplifier, the input WDM signal light is applied to a branching filter 11, and is branched into a signal light Es (C) of C-band, a signal light Es (L) of L-band, and signal lights Es1, Es2 and Es3 outside of the C- and L-bands. To the output port corresponding to the C-band of the branching filter 11 is connected the input port of the C-band EDFA 12. Furthermore, to the output port corresponding to the L-band of the branching filter 11 is connected the input port of the L-band EDFA 13. Moreover, to the output port corresponding to other than the C- and L-bands is connected the signal light input port of a multiplexer 2 in the abovementioned basic configuration. Here the C-band EDFA 12 and the L-band EDFA 13 function as a second optical amplifying section.

Furthermore, in the present optical parametric amplifier, an EDFA having an amplification band in the C- and L-bands is used as the optical amplifier 1 in the beforementioned basic configuration, and an optical fiber is used as the nonlinear optical medium 3. Moreover, an optical filter (FIL) 15 is provided on the output end of the nonlinear optical medium 3. This optical filter 15 is for filtering the optical signals Es1, Es2, and Es3 from the output light from the nonlinear optical medium 3.

In FIG. 4, for the optical amplifier 1, an example is shown which amplifies the C- and L-bands with one EDFA, however the optical amplifier 1 may be constructed by individually providing EDFAs for each band. Furthermore, the nonlinear optical medium 3 is not limited to an optical fiber, and it is also possible to use an HNLF or PPLN waveguide as mentioned before, or a GaAlAs device or the like.

Figure 5:
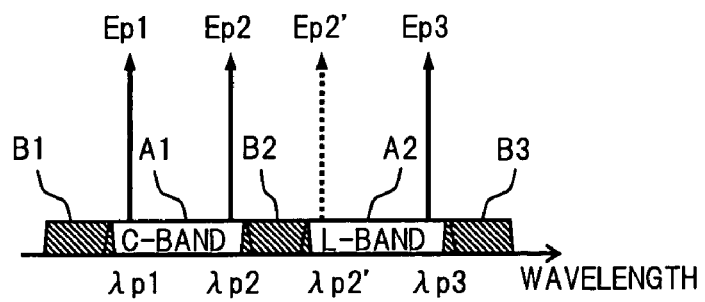
FIG. 5 is a diagram showing a wavelength arrangement of pumping light in the first embodiment.

FIG. 5 shows an example of a wavelength arrangement for the pumping light in the aforementioned optical parametric amplifier. Here a pumping light Ep1 having a wavelength λp1 is used for the range which is relatively close to the edge on the short wavelength side of the amplification band A1 corresponding to the C-band of the optical amplifier (EDFA) 1, a pumping light Ep2 having a wavelength λp2 is used for the range which is relatively close to the edge on the long wavelength side of the amplification band A1, and a pumping light Ep3 having a wavelength λp3 is used for the range which is relatively close to the edge on the long wavelength side of the amplification band A2 corresponding to the L-band of the optical amplifier 1. These pumping lights Ep1 to Ep3 are amplified up to a desired level by the optical amplifier 1, and are then applied to the nonlinear optical medium (optical fiber) 3 via the multiplexer 2, to thereby obtain the optical parametric amplification band B1 on the short wavelength side from the C-band, the optical parametric amplification band B2 between the C-band and the L-band, and the optical parametric amplification band B3 on the long wavelength side from the L-band.

In the above example, in order to obtain the optical parametric amplification band B2 between the C-band and the L-band, the pumping light Ep2 is positioned in the region which is comparatively close to the edge on the long wavelength side of the amplification band A1 corresponding to the C-band. However, instead of this pumping light Ep2, as shown by the broken line arrow in FIG. 5, a pumping light Ep2' having a wavelength λp2' may be used for the range which is comparatively close to the edge on the short wavelength side of the amplification band A2 corresponding to the L-band, to thereby obtain the optical parametric amplification band B2 between the C-band and the L-band.

In the optical parametric amplifier of the above described configuration, the C-band signal light Es (C) and the L-band signal light Es (L) which are branched by the branching filter 11 are respectively amplified by the C-band EDFA 12 and the L-band EDFA 13 in a similar manner to heretofore. On the other hand, the optical signals Es1 to Es3 which are outside of the C- and L-bands which are branched by the branching filter 11, are input to the nonlinear optical medium 3 to which the pumping lights Ep1 to Ep3 are applied in a sufficiently large power via the multiplexer 2, to thereby give optical parametric amplification. Then, the signal lights Es (C) and Es (L), which have been respectively amplified by the C-band EDFA 12 and the L-band EDFA 13, and the signal lights Es1 to Es3 which have been filtered by the optical filter 15 after being amplified by the nonlinear optical medium 3, are multiplexed in the multiplexer 14 and output to the outside.

As mentioned above, according to the optical parametric amplifier of the first embodiment, the amplification range outside of the C- and L-bands which cannot be covered by the conventional practical EDFA, can be realized by the optical parametric amplification effect due to the pumping lights Ep1 to Ep3, so that signal light which is allocated over an extremely wide wavelength band which includes the C- and the L-bands can be comparatively easily amplified.

Next is a description of a second embodiment of the present invention.

Figure 6:
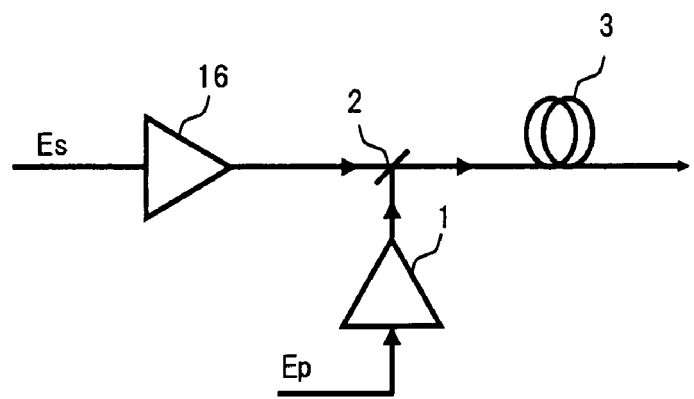
FIG. 6 is a diagram showing a configuration of a second embodiment of an optical parametric amplifier according to the present invention.

FIG. 6 is a diagram showing a configuration of the second embodiment of an optical parametric amplifier according to the present invention.

In FIG. 6, the optical parametric amplifier of this embodiment is one which uses the basic configuration shown before in FIG. 1, to increase the gain with respect to the signal light of a specific wavelength in the conventional optical amplifier. More specifically, in this optical parametric amplifier, the input signal light Es is applied to a conventional optical amplifier 16 such as an EDFA. This optical amplifier 16 is basically the same as the optical amplifier 1 to which the pumping light Ep is input. Here the wavelength λs of the signal light Es is set to a wavelength which is different to the wavelength λp of the pumping light Ep in the amplification band of the optical amplifier 16. The signal light Es amplified by the optical amplifier 16 is applied to the signal light input port of the multiplexer 2 in the basic configuration shown before in FIG. 1, and is input to the nonlinear optical medium 3 using an optical fiber or the like via the multiplexer 2.

Figure 7:
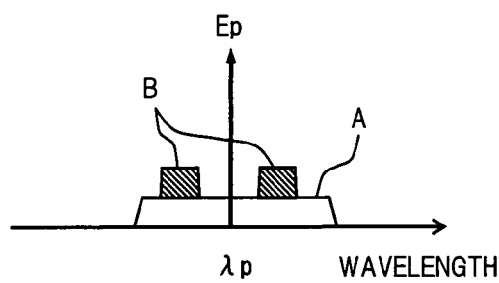
FIG. 7 is a diagram showing an example of pumping light wavelength and amplification bands in the second embodiment.

FIG. 7 shows an example of wavelength and amplification bands of pumping light in the aforementioned optical parametric amplifier. Here pumping light Ep having a wavelength λp is used in the band positioned close to the center of the amplification band A of the optical amplifier 1. The pumping light Ep is amplified to a desired level by the optical amplifier 1, and is then applied to the nonlinear optical medium 3 via the multiplexer 2, to thereby obtain the optical parametric amplification band B on the short wavelength side and the long wavelength side of the pumping light wavelength λp within the amplification band A of the optical amplifier 1 (basically the same as the amplification band of the optical amplifier 16). As a result, for the whole of the present optical parametric amplifier, the gain of the optical amplifier 16 with respect to the signal light Es corresponding to the aforementioned amplification band B is increased by the gain amount for the optical parametric amplification. That is to say, in the case where the gain of the conventional optical amplifier increases with respect to the signal light of a specific wavelength, then use of the aforementioned optical parametric amplification is effective.

Heretofore, in the case where the gain wavelength characteristics of the optical amplifier are flattened, an optical loss circuit which changes the loss depending on the wavelength is used, and it is common to equalize so that the gains over the whole amplification range are all the same at a minimum gain difference. However, with this conventional gain equalization means, the result is that a large loss is added to the amplified signal light. To address this, if as with the present optical parametric amplifier, optical parametric amplification is used to equalize the gain of the conventional optical amplifier 16, then by optical parametric amplifying the wavelength region for which the gain is relatively low, the whole amplification band of the optical amplifier 16 can be flattened at a high gain. As a result, it is possible to realize gain equalization of the optical amplifier 16 while improving the gain, without generating losses.

Next is a description of a third embodiment of the present invention.

Figure 8:
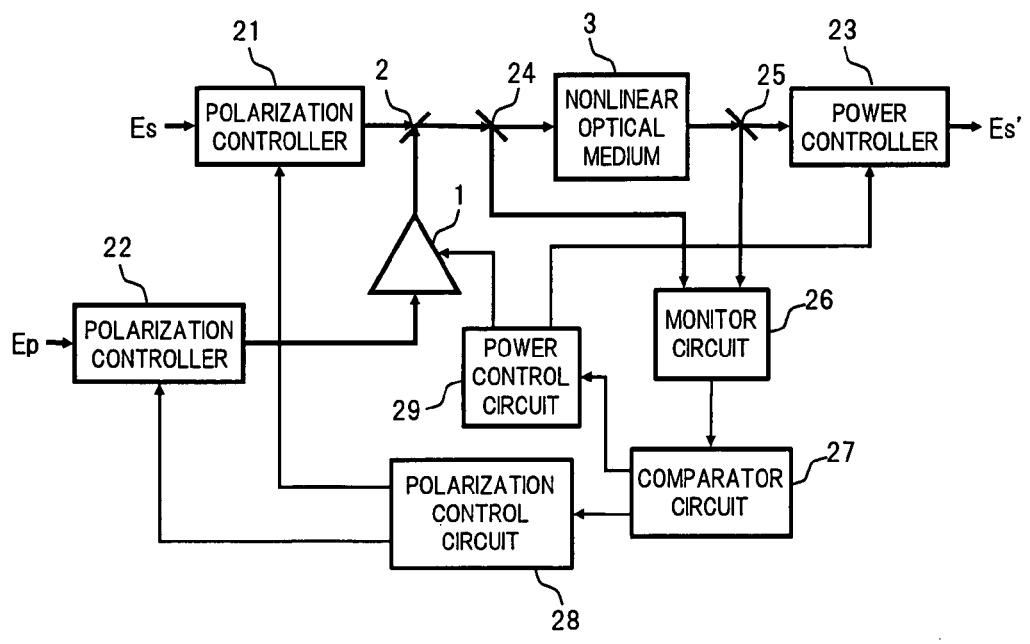
FIG. 8 is a diagram showing a configuration of a third embodiment of an optical parametric amplifier according to the present invention.

FIG. 8 is a diagram showing a configuration of the third embodiment of an optical parametric amplifier according to the present invention.

In FIG. 8, the optical parametric amplifier of this embodiment is an application example for where in the basic configuration shown before in FIG. 1, control of the polarization and power of the signal light and the pumping light is performed so as to produce the nonlinear optical effect at an optimum state.

More specifically, in this optical parametric amplifier, a polarization controller 21 for controlling the polarization of the input signal light Es, is connected to the signal light input port of a multiplexer 2. Furthermore, a polarization controller 22 for controlling the polarization of the pumping light Ep, is connected to the input port of an optical amplifier 1. Moreover, a power controller 23 (for example a variable optical attenuator or the like) for controlling the power of the output signal light Es', is provided after a nonlinear optical medium 3. In addition, as a configuration for controlling the above-mentioned polarization controllers 21 and 22, the power controller 23, and the optical amplifier 1, there is provided: respective take out branching filters 24 and 25 for where a part of the signal light and the pumping light input/output with respect to the nonlinear optical medium 3 is made monitor light; a monitor circuit 26 which detects the power of the respective monitor lights; a comparator circuit 27 which compares the monitor light power detected by the monitor circuit 26; a polarization control circuit 28 which optimizes the polarization of the signal light and the pumping light based on the comparison results of the comparator circuit 27; and a power control circuit 29 which optimizes the power of the signal light and the pumping light.

As a control method for the polarization and the power of the signal light and the pumping light executed by the optical parametric amplifier of the abovementioned configuration, at first the polarization of the input signal light Es and the pumping light Ep is adjusted using the polarization controllers 21 and 22, so as to give a condition where the nonlinear optical effect in the nonlinear optical medium 3 is optimally produced, that is to say a polarization state where the input signal light Es and the pumping light Ep become substantially the same polarization. This optimization of the polarization, more specifically so that the power of the monitor light corresponding to the signal light on the output side detected by the monitor circuit 26 becomes a maximum, is achieved by feedback controlling the polarization controllers 21 and 22 by the polarization control circuit 28.

Next the optical amplifier 1 is controlled, and the power of the pumping light Ep is adjusted so that sufficient optical parametric gain is produced in the nonlinear optical medium 3. This power adjustment of the pumping light Ep, more specifically so that the power of the monitor light corresponding to the pumping light on the input side detected by the monitor circuit 26 becomes a necessary value, is achieved by feedback controlling the gain of the optical amplifier 1 by the power control circuit 29. Then, finally control of the power controller 23 provided on the output end is performed corresponding to the power of the monitor light corresponding to the signal light on the output side detected by the monitor circuit 26, so that the power of the signal light Es' output from the optical parametric amplifier becomes a desired level.

In the above manner, according to the optical parametric amplifier of the third embodiment, since the polarization and the power of the signal light and the pumping light input to the nonlinear optical medium 3 is optimized, it is possible to optical parametric amplify the signal light stably and to a desired level with a favorable efficiency.

In the third embodiment, the configuration example was shown for where the polarization controllers 21 and 22 were provided corresponding to both of the signal light and the pumping light, however since it is sufficient if the relative polarization of the signal light and the pumping light can be controlled, then it is possible to omit one of the polarization controllers 21 and 22. Furthermore, the power controller 23 was positioned after the nonlinear optical medium 3, however the power controller 23 may be positioned before the nonlinear optical medium 3 to perform control of the signal light power.

Next is a description of a fourth embodiment of the present invention.

Figure 9:
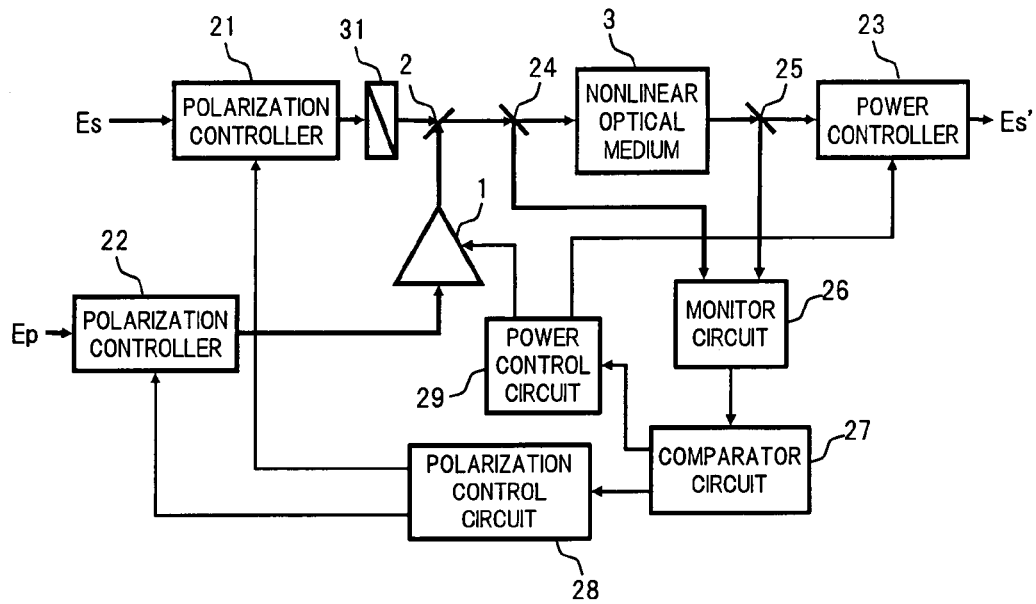
FIG. 9 is a diagram showing a configuration of a fourth embodiment of an optical parametric amplifier according to the present invention.

FIG. 9 is a diagram showing a configuration of the fourth embodiment of an optical parametric amplifier according to the present invention.

In FIG. 9, the optical parametric amplifier of this embodiment is an application example in which a configuration which is not dependent on the polarization of the input optical signal is realized for the aforementioned third embodiment shown in FIG. 8. More specifically, the point where a polarizer 31 is provided between the branching filter 11 and the multiplexer 2 is different to in the third embodiment. This polarizer 31 is for example a polarization beam splitter (PBS) or an optical crystal having birefringence, which passes light of the polarization principle axis components and shuts of components with the orthogonal polarization.

In the optical parametric amplifier of the abovementioned configuration, the optical signal Es input with arbitrary optional polarization is input to the polarization controller 21 and the polarizer 31, so that after converting to linear polarized light of the same direction as the polarization principle axis of the polarizer 31 it is applied to the nonlinear optical medium 3. By means of such a configuration, the polarization controller 21 is preferably optimized so that the power of the signal light which passes through the polarizer 31 becomes a maximum. Here feedback control of the polarization controller 21 is performed by the polarization control circuit 28 so that the power of the monitor light corresponding to the signal light on the input side detected by the monitor circuit 26 becomes a maximum. The control of the polarization of the pumping light with respect to the polarization of the signal light, and the control of the power of the signal light and the pumping light, can be performed by a similar method to the case of the aforementioned third embodiment.

In the above manner, according to the optical parametric amplifier of the fourth embodiment, the situation where the optical parametric amplification characteristics change depending on the polarization of the input signal light is avoided, and hence the parametric amplification of the signal light can be carried out more stably.

Next is a description of a fifth embodiment of the present invention.

Figure 10:
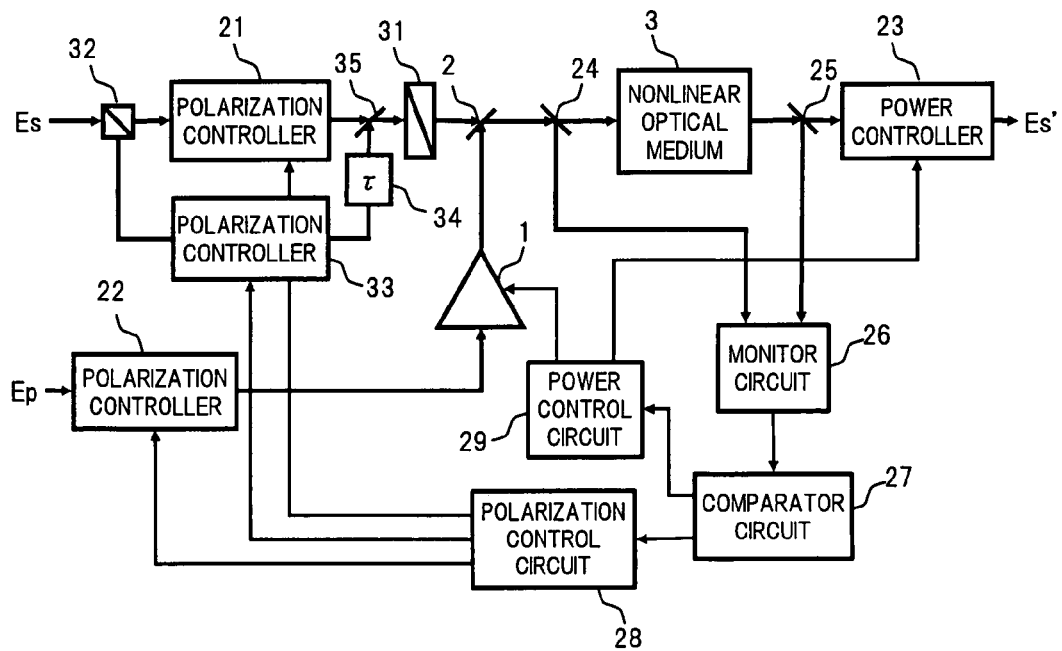
FIG. 10 is a diagram showing a configuration of a fifth embodiment of an optical parametric amplifier according to the present invention.

FIG. 10 is a diagram showing a configuration of the fifth embodiment of an optical parametric amplifier according to the present invention.

In FIG. 10, the optical parametric amplifier of this embodiment is a modified example which realizes a configuration which is not dependent on the polarization of the input signal light, by a method which is different to that of the fourth embodiment shown in FIG. 9. More specifically, in this optical parametric amplifier, a polarization beam splitter (PBS) 32 is provided before the polarization controller 21, and by means of the PBS 32, the input signal light Es is separated into two orthogonal polarization states, and after being converted to linear polarized light of the same direction by the polarization controllers 21 and 33 respectively corresponding to these, the power is combined in a combiner 35. In this power combining, a time adjusting optical circuit 34 is used as necessary in order to match the timing of the two polarized components. The signal light Es for which the power has been combined in the combiner 35 is applied to the nonlinear optical medium 3 via the polarizer 31.

Also by means of the optical parametric amplifier of the fifth embodiment, similarly to the case of the fourth embodiment, the signal light Es input in arbitrary optional polarized condition is converted to a predetermined linear polarized light, and then applied to the nonlinear optical medium 3, and the situation where the optical parametric amplification characteristics are changed depending on the polarization of the input signal light is avoided, and hence the parametric amplification of the signal light can be more stably performed.

Next is description of a sixth embodiment of the present invention.

Figure 11:
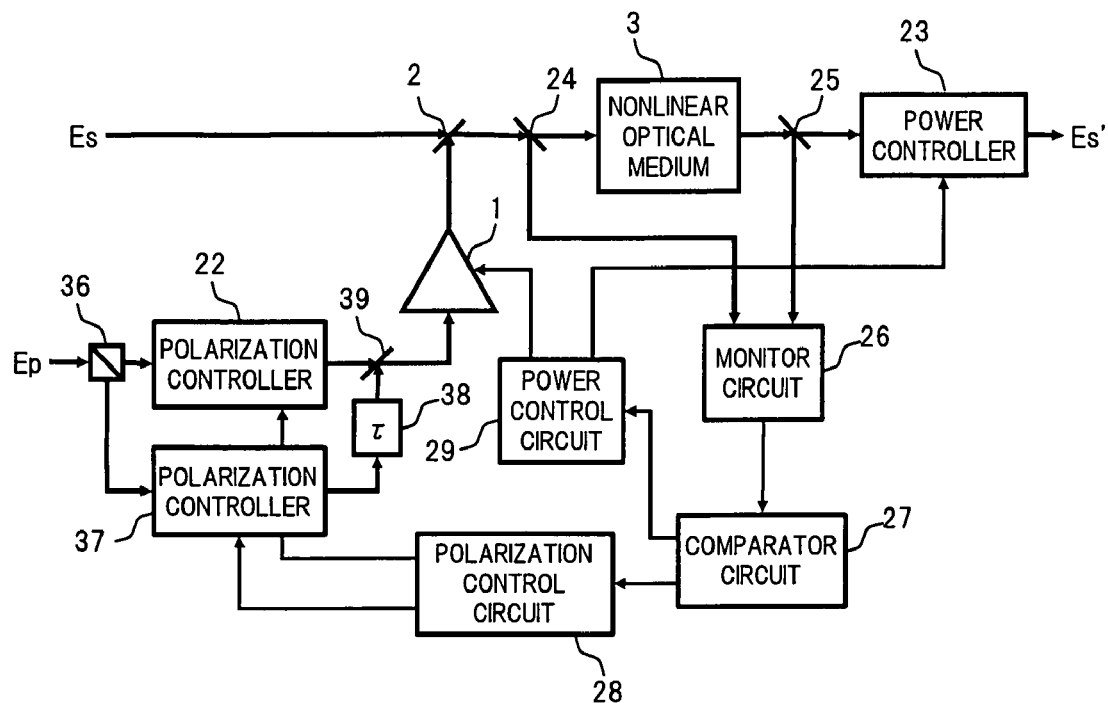
FIG. 11 is a diagram showing a configuration of a sixth embodiment of an optical parametric amplifier according to the present invention.

FIG. 11 is a diagram showing a configuration of the sixth embodiment of an optical parametric amplifier according to the present invention.

In FIG. 11, the optical parametric amplifier of this embodiment is a modified example which realizes a configuration which is not dependent on the polarization of the input signal light, by a method which is different to that of the fourth and fifth embodiments shown before in FIG. 9 and FIG. 10. More specifically, in this optical parametric amplifier, a polarization beam splitter (PBS) 36 is provided before the polarization controller 22, and by means of the PBS 36, the pumping light Ep is separated into two orthogonal polarization states, and after being converted to the same linear polarized light while keeping the orthogonal polarization states, by the polarization controllers 22 and 37 respectively corresponding to these, the power is combined in a combiner 39. In this power combining, a time adjusting optical circuit 38 is used as necessary in order to match the timing of the two polarized components. The pumping light Ep for which the power has been combined in the combiner 39 is amplified up to a necessary level in the optical amplifier 1, and is then applied to the nonlinear optical medium 3 via the multiplexer 2. Here the signal light Es which is input with arbitrary optional polarization is applied to the nonlinear optical medium 3 via the multiplexer 2.

In the optical parametric amplifier of the abovementioned configuration, the pumping light Ep which is power combined while keeping the cross polarization states, is applied to the nonlinear optical medium 3 to thereby obtain a uniform optical parametric amplification effect even if the signal light Es is input to the nonlinear optical medium 3 in arbitrary optional polarization. As a result, the situation where the optical parametric amplification characteristics are changed depending on the polarization of the input signal light is avoided, and hence the parametric amplification of the signal light can be more stably performed.

In the sixth embodiment, the pumping light is power combined after being separated into two orthogonal polarization states, however as a concept similar to this, the pumping light may be applied to the nonlinear optical medium 3 via the optical amplifier 1 and the multiplexer 2 after being converted to circularly polarized light. Furthermore, it is also possible to adopt a configuration of a polarization diversity method where the signal light is separated into two linear polarized light components which are orthogonal, and after these respective linear polarized light components have been optical parametric amplified by the present invention, they are polarization re-combined. Moreover it is also possible to realize an optical parametric amplifier which is not dependent on the polarization of the input signal light, by applying to the present invention, a configuration where a polarization-maintained fiber (nonlinear optical medium) such as for example that shown in FIG. 9 of Japanese Unexamined Patent Publication No. 7-98464 is connected in a loop form.

Next is a description of a seventh embodiment of the present invention.

Figure 12:
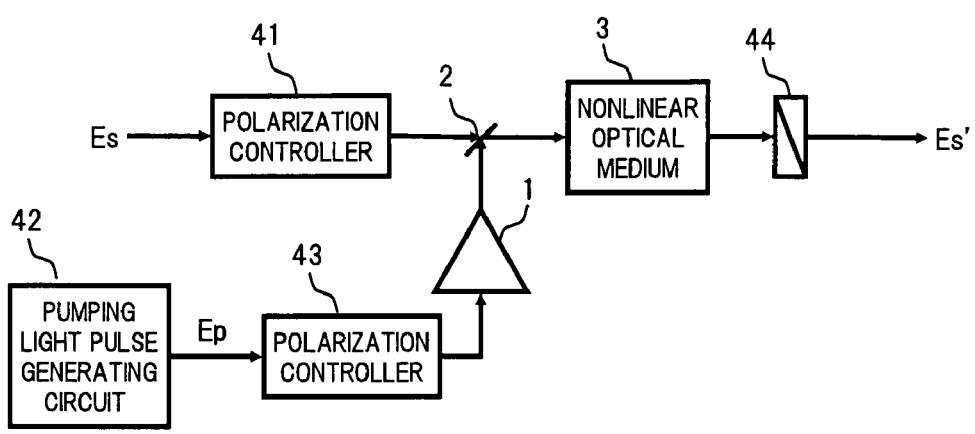
FIG. 12 is a diagram showing a configuration of a seventh embodiment of an optical parametric amplifier according to the present invention.

FIG. 12 is a diagram showing a configuration of the seventh embodiment of the optical parametric amplifier of the present invention.

In FIG. 12, the optical parametric amplifier of this embodiment, in the basic configuration shown before in FIG. 1, comprises: a polarization controller 41 which controls the polarization of the input light signal light Es and outputs to the multiplexer 2; a pumping light pulse generating circuit 42 which generates a pulsed pumping light; a polarization controller 43 which controls the polarization of the pumping light pulse Ep output from the pumping light pulse generating circuit 42, and outputs this to the optical amplifier 1; and a polarizer 44 arranged on the output end of the nonlinear optical medium 3, and the parametric amplification of the signal light has a switching operation.

The pumping light pulse generating circuit 42 generates a pumping light pulse Ep in which a pumping light having a wavelength within the amplification band of the optical amplifier 1 is pulsed in accordance with a necessary pattern. The wavelength position of the pumping light pulse Ep and the signal light Es is basically the same as for the case shown before in FIG. 2.

The polarization controller 43 controls the polarization state of the pumping light pulse Ep output from the pumping light pulse generating circuit 42. Here the polarization state of the pumping light Ep is set to linear in a predetermined angle with respect to the polarization direction of the signal light Es controlled by the polarization controller 41. Preferably, the polarization state of the pumping light pulse Ep is set to linear so that the angle between the polarization direction of the signal light Es, and the polarization direction of the pumping light pulse Ep becomes 40 to 50 degrees (for example 45 degrees).

The polarizer 44 is for example a polarization beam splitter (PBS) or a birefringent optical crystal, which passes light of the polarization principle axis components and blocks off light of the orthogonal components. Here the polarization principle axis of the polarizer 44 is set so as to be orthogonal to the polarization direction of the signal light Es. In other words, the polarizer 44 controls the polarization direction of the signal light Es so that this becomes orthogonal to the polarization principle axis of the polarizer 44.

In the optical parametric amplifier of the above configuration, the signal light Es for which the polarization direction has been controlled by the polarization controller 41 so that it becomes orthogonal to the polarization principle axis of the polarizer 44 at the input of the polarizer, and the pumping light pulse Ep for which the polarization direction has been controlled by the polarization controller 43 to a direction approximately 45 degrees with respect to the polarization direction of the signal light Es, and after which has been amplified to a necessary level by the optical amplifier 1, are combined by the multiplexer 2, and input to the nonlinear optical medium 3.

Figure 13:
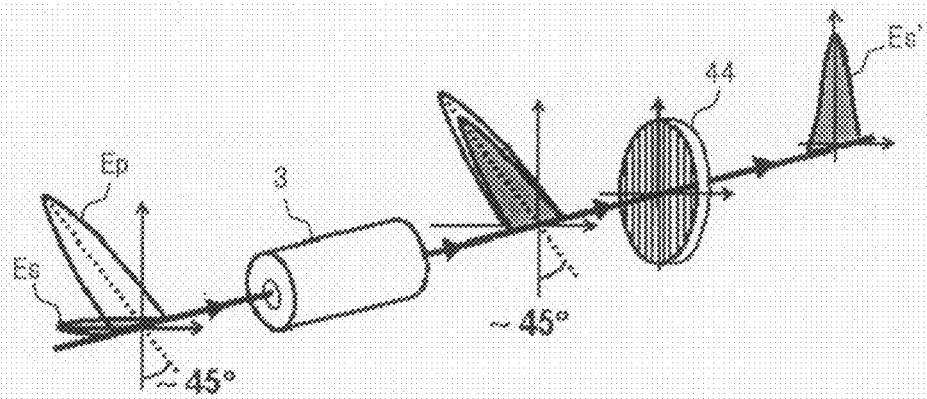
FIG. 13 is a diagram schematically showing a switching operation in the seventh embodiment.

In the nonlinear optical medium 3, when the power of the pumping light pulse Ep is a low level such that FWM or the like is not produced, the signal light Es passes through the nonlinear optical medium 3 without being parametric amplified, and all of the polarized light components of the signal light Es are shut off by the polarizer 44. On the other hand, when the power of the pumping light pulse Ep exceeds a level which produces the nonlinear optical effect, then as shown by the schematic of FIG. 13, the signal light Es is optical parametric amplified in the polarization direction of the pumping light pulse Ep, and as a result, the polarization state of the signal light Es is changed so that the components of one part pass through the polarizer 44. Since FWM is selectively produced with respect to the signal light Es of the same polarization component as the pumping light pulse Ep, then when the power of the pumping light Ep becomes sufficiently large, then due to the optical parametric amplification effect, the polarization state of the signal light Es becomes close to the polarization of a 45 degrees direction the same as the pumping light pulse Ep. Therefore, the transmitted light of the polarizer 44 is rapidly amplified together with the increase in the power of the pumping light pulse Ep. Consequently, the present optical parametric amplifier has a switching operation following the pattern of the pumping light pulse Ep, and realizes an optical amplifier which amplifies the signal light only at a desired time interval, and suppresses the signal light at other times. The response time of the FWM within the nonlinear optical medium is of femtosecond order being super high speed, and realization of an optical parametric amplifier which can also correspond to very high speed signal light in excess of terabits can be expected.

Furthermore, in the above optical parametric amplifier, the off-level of the signal light Es is shut off to a sufficiently low value by the polarizer 44, and hence optical amplification of a high performance having a high extinction ratio and a high optical S/N ratio is possible. Furthermore, it is possible to also suppress the fluctuations and noise of the off-level of the signal light Es by the polarizer 44.

Next is a description of an eight embodiment of the present invention.

Figure 14:
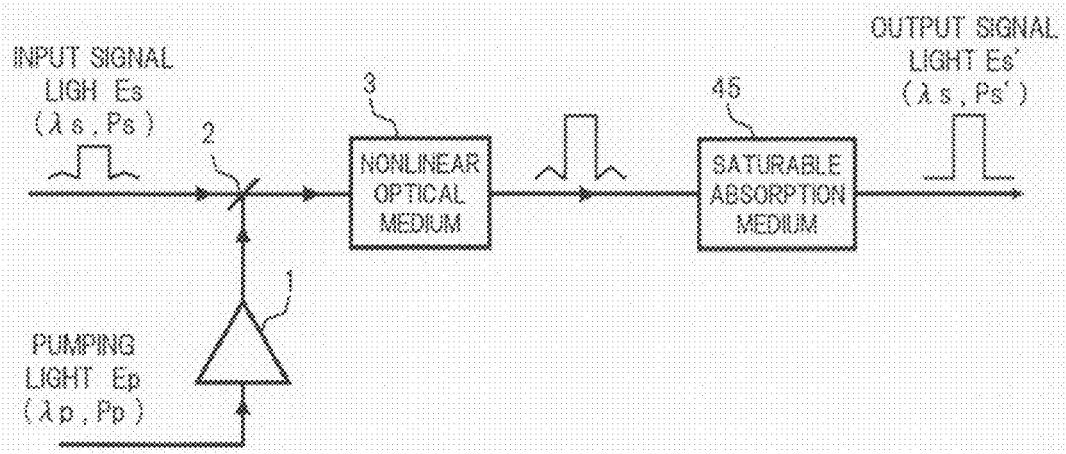
FIG. 14 is a diagram showing a configuration of an eighth embodiment of an optical parametric amplifier according to the present invention.

FIG. 14 shows a configuration of the eighth embodiment of an optical parametric amplifier according to the present invention.

In FIG. 14, the optical parametric amplifier of this embodiment is an application example which suppresses the fluctuations of the off-level of the signal light in the basic configuration shown before in FIG. 1, by a method which is different to that of the seventh embodiment. More specifically, in this optical parametric amplifier, a saturable absorption medium 45 is arranged after the nonlinear optical medium 3. For this saturable absorption medium 45 it is possible to use for example an optical semiconductor element, an electroabsorption type optical element, a Mach-Zehnder interferometer type optical fiber switch, or a nonlinear optical loop mirror (NOLM) type switch. By providing the above supersaturated absorption medium 45, it is possible to suppress the fluctuations of the off-level of the signal light.

In the eighth embodiment, the example is shown for where the saturable absorption medium is provided after the nonlinear optical medium, however even if the saturable absorption medium is provided before the nonlinear optical medium 3, the fluctuations in the off-level of the signal light can be suppressed.

What is claimed is:

1. An optical parametric amplifier provided with a nonlinear optical medium to which is input signal light and pumping light, which amplifies the signal light by an optical parametric amplification effect due to the pumping light, and outputs this, said optical parametric amplifier comprising:
    a signal light input port to which is input said signal light;
    a pumping light input port to which is input said pumping light for which the wavelength is different to that of said signal light;
    a first optical amplifying section which has an amplification band which includes the wavelength of said pumping light and doesn't include the wavelength of said signal light, and which amplifies said pumping light input to said pumping light input port, and outputs this; and
    a pumping light supply section which supplies said pumping light output from said first optical amplifying section, together with said signal light input to said signal light input port and having a wavelength outside the amplification band of said first optical amplifying section, to said nonlinear optical medium, wherein
    said first optical amplifying section is constructed using an erbium doped fiber amplifier having an amplification band in a C-band,
    said pumping light has a wavelength close to the edge on the short wavelength side in the C-band, and
    said nonlinear optical medium amplifies signal light having a wavelength in a region on the short wavelength side from the C-band, by an optical parametric amplification effect due to said pumping light, and outputs this.

2. An optical parametric amplifier according to claim 1, comprising:
    a branching section to which is input WDM signal light input to said signal light input port, which includes a plurality of signal lights for which the wavelengths are different, and which branches the WDM signal light into; signal light of a first wavelength band having a wavelength outside of the amplification band of said first optical amplifier, and signal light of a second wavelength band having a wavelength within of the amplification band of said first optical amplifier;
    a multiplexing section which combines the optical signal of said first wavelength band, and the optical signal of said second wavelength band; and
    a second amplifying section which has an amplification band corresponding to the amplification band of said first amplifying section, which amplifies the signal light of said second wavelength band output from said branching section, and outputs this to said multiplexing section, characterized in that
    said pumping light supply section supplies said pumping light which has been amplified by said first optical amplifying section, together with signal light of said first wavelength band output from said branching section, to said nonlinear optical medium, and
    said nonlinear optical medium amplifies signal light of said first wavelength band by the optical parametric amplification effect due to said pumping light, and outputs this to said multiplexing section.

3. An optical parametric amplifier according to claim 1, comprising an optical filter which sorts optical parametric amplified signal light, from output light of said nonlinear optical medium.

4. An optical parametric amplifier according to claim 1, wherein said nonlinear optical medium is an optical fiber having an average zero dispersion wavelength matching or approximately matching the wavelength of said pumping light.

5. An optical parametric amplifier according to claim 1, wherein said nonlinear optical medium is a highly nonlinear fiber in which the optical power density within the mode field is increased more than the optical power density within the mode field in a single mode optical fiber.

6. An optical parametric amplifier according to claim 5, wherein said highly nonlinear fiber has a structure in which the mode field has been made more narrow than the mode field in a single mode optical fiber.

7. An optical parametric amplifier according to claim 5, wherein said highly nonlinear fiber has a structure in which at least one of germanium and bismuth has been doped in the core.

8. An optical parametric amplifier according to claim 1, wherein said nonlinear optical medium is a photonic crystal fiber.

9. An optical parametric amplifier according to claim 1, wherein said nonlinear optical medium is an optical waveguide having a quasi-phase matching structure.

10. An optical parametric amplifier according to claim 1, wherein said nonlinear optical medium is a gallium-aluminum arsenic (GaAlAs) element.

11. An optical parametric amplifier according to claim 2, comprising:
    a polarization controller which controls the relative polarization of the signal light and the pumping light input to said nonlinear optical medium;
    a monitor section which monitors the power of signal light and pumping light input/output to said nonlinear optical medium; and
    a control section which controls said polarization controller so that the power of signal light output from said nonlinear optical medium becomes a maximum, based on the monitor result of said monitor section, and then controls said first optical amplifying section so that the power of pumping light input to said nonlinear optical medium becomes a predetermined value.

12. An optical parametric amplifier according to claim 11, comprising:
   a power controller which controls the power of signal light output from said nonlinear optical medium;
   and said control section controls said power controller so that the power of signal light output from said nonlinear optical medium becomes a predetermined value.

13. An optical parametric amplifier according to claim 2, comprising:
   a device for making the signal light input to said nonlinear optical medium, linear polarized light.

14. An optical parametric amplifier according to claim 2, comprising:
   a device for making the pumping light input to said nonlinear optical medium, circularly polarized light.

15. An optical parametric amplifier according to claim 2, comprising:
   a polarizer arranged on the output side of said nonlinear optical medium;
   a first polarization controller which controls the polarization of the signal light output from the nonlinear optical medium to a direction orthogonal to the polarization principle axis of said polarizer;
   a pumping light pulse generating circuit which pulses said pumping light and provides this to said first optical amplifying section; and
   a second polarization controller provided between said pumping light pulse generating circuit and said first optical amplifying section, which sets the polarization direction of the pumping light pulse to a predetermined angle with respect to the polarization direction of said signal light,
   and said nonlinear optical medium amplifies said signal light by the optical parametric amplification effect due to said pumping light, in the polarization direction of said pumping light pulse.

16. An optical parametric amplifier according to claim 2, wherein a saturable absorption medium is provided before or after said nonlinear optical medium.

17. An optical parametric amplifier provided with a nonlinear optical medium to which is input signal light and pumping light, which amplifies the signal light by an optical parametric amplification effect due to the pumping light, and outputs this, said optical parametric amplifier comprising:
   a signal light input port to which is input said signal light;
   a pumping light input port to which is input said pumping light for which the wavelength is different to that of said signal light;
   a first optical amplifying section which has an amplification band which includes the wavelength of said pumping light and doesn't include the wavelength of said signal light, and which amplifies said pumping light input to said pumping light input port, and outputs this; and
   a pumping light supply section which supplies said pumping light output from said first optical amplifying section, together with said signal light input to said signal light input port and having a wavelength outside the amplification band of said first optical amplifying section, to said nonlinear optical medium, wherein
   said first optical amplifying section is constructed using an erbium doped fiber amplifier having an amplification band in either one of a C-band and an L-band,
   said pumping light has a wavelength close to the edge on the long wavelength side in the C-band, or close to the edge on the short wavelength side in the L-band, and
   said nonlinear optical medium amplifies signal light having a wavelength in a region between the C-band and the L-band, by an optical parametric amplification effect due to said pumping light, and outputs this.

18. An optical parametric amplifier provided with a nonlinear optical medium to which is input signal light and pumping light, which amplifies the signal light by an optical parametric amplification effect due to the pumping light, and outputs this, said optical parametric amplifier comprising:
   a signal light input port to which is input said signal light;
   a pumping light input port to which is input said pumping light for which the wavelength is different to that of said signal light;
   a first optical amplifying section which has an amplification band which includes the wavelength of said pumping light and doesn't include the wavelength of said signal light, and which amplifies said pumping light input to said pumping light input port, and outputs this; and
   a pumping light supply section which supplies said pumping light output from said first optical amplifying section, together with said signal light input to said signal light input port and having a wavelength outside the amplification band of said first optical amplifying section, to said nonlinear optical medium, wherein
   said first optical amplifying section is constructed using an erbium doped fiber amplifier having an amplification band in an L-band,
   said pumping light has a wavelength close to the edge on the long wavelength side in the L-band, and
   said nonlinear optical medium amplifies signal light having a wavelength in a region on the long wavelength side from the L-band, by an optical parametric amplification effect due to said pumping light, and outputs this.

* * * * *